Sept. 27, 1960  R. L. CARLSTEDT  2,953,951
BORING TOOL
Filed April 4, 1958
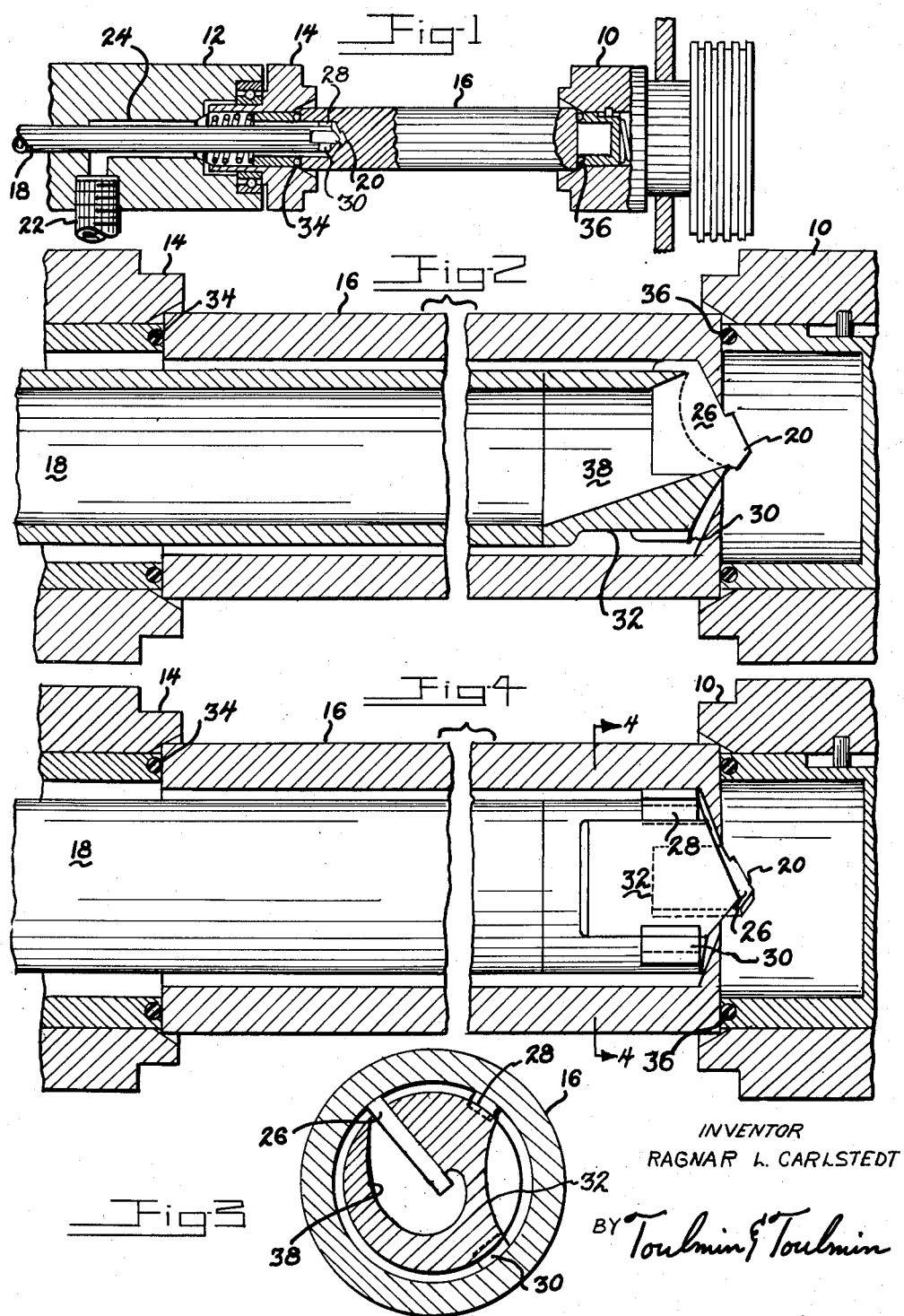
INVENTOR
RAGNAR L. CARLSTEDT
BY Toulmin & Toulmin
ATTORNEYS

United States Patent Office 2,953,951
Patented Sept. 27, 1960

2,953,951

BORING TOOL

Ragnar L. Carlstedt, Cincinnati, Ohio, assignor to The R. K. Le Blond Machine Tool Co., Cincinnati, Ohio Filed Apr. 4, 1958, Ser. No. 726,470

2 Claims. (Cl. 77—68)

This invention relates to boring machine drills, and particularly drills for boring machines which have internal chip disposal.

In boring machines for rapidly boring holes in workpieces, the preferred type of machine is one in which a hollow boring tool is pressed against the end of a rotating workpiece. A boring tool thrust against a workpiece in this manner insures the boring of a hole straight along the axis of the workpiece and concentric with the axis.

Drilling or boring operations can be carried out extremely rapidly in this manner provided the cutting end of the boring tool is maintained cool and the chips taken thereby are flushed away from the cutting tool. The cooling of the cutting tool and the flushing away of the chips is preferably accomplished by supplying a lubricant-coolant under extremely high pressure up to 400 to 500 pounds per square inch, along the outside of the boring tool and this coolant passes around the cutting end of the tool cooling the tool and the workpiece and lubricating the cutting edge of the tool while simultaneously flushing the chips taken by the tool backwardly through the hollow rod that supports and forms a portion of the tool.

The cutting action of the tool, such tools having a single cutting edge, forces the tool normally toward the side of the hole being bored opposite the said cutting edge. This thrust on the boring tool is normally sustained by a pair of support pads carried by the tool on the opposite side from the cutting edge thereof. These pads adequately support the cutting tool so that a perfectly straight uniform hole is bored thereby.

It sometimes happens, however, that a boring or drilling operation is interrupted before the boring tool is completely through the work and when this occurs, there is a tendency for the boring tool to commence vibrating since the pressure on the support pads is relieved and the vibration of the boring tool will cause the hole to be cut out oversize in the region where the cutting element has stopped. The relatively high speed of the spindle causes the spindle to coast when the machine is shut down for any reason and it is not possible to bring the spindle to a halt before the foregoing enlarging action obtains.

When the boring tool breaks through the end of the workpiece a similar situation arises in that there is no pressure on the support pads and the boring bar will tend to commence vibrating and the extended end of the bored hole may be enlarged in the manner described above. Such enlargement of the hole can become quite serious and may be up to as much as .009 of an inch on the diameter.

Having the foregoing in mind, the present invention has for a particular object the provision of an improved high speed boring arrangement which substantially eliminates any tendency for the hole being drilled to become oversize due to halting of the drilling operation part way through the workpiece.

A still further object of this invention is the provision of an improved arrangement for the high speed boring of holes in workpieces and in which there is no tendency for the terminal end of the hole where the boring tool breaks through the end of the workpiece to be oversize.

Still another object of this invention is the provision of a method of boring rotating workpieces with a boring tool to which a high pressure lubricant-coolant is supplied which utilizes the pressure of the lubricant-coolant to prevent vibration of the boring bar in case the drilling operation is interrupted or at the time the drill breaks through the end of the workpiece.

These and other objects and advantages will become more apparent upon reference to the accompanying drawings, in which:

Figure 1 is a diagrammatic representation of a high speed boring machine according to the present invention, Figure 2 is an enlarged longitudinal sectional view showing the boring tool as it is breaking through the end of the workpiece, Figure 3 is a cross sectional view indicated by line 3—3 on Figure 2 showing the positions of the cutting edge and the support pads on the tool, and Figure 4 is a view looking in at the side of the tool showing a relieved portion formed thereon which tends to prevent vibration of the boring bar.

Referring to the drawings more in detail, in Figure 1 there is illustrated very diagrammatically a boring machine having a rotatable spindle 10 and a clamp 12 that has a rotatable nose portion 14 between which nose portion and spindle 10 there is clamped an elongated workpiece 16.

The workpiece 16 is adapted for being bored on its axis of rotation by a boring tool consisting of an elongated tubular support portion 18 having a drill portion 20 at its end that engages the rotating workpiece in cutting relation.

For cooling the workpiece and the boring tool and for flushing away chips taken by the boring tool there is supplied a lubricant and coolant under high pressure along the outside of the boring tool via conduit 22 and passage 24 in the clamp. This lubricant, which is preferably a cutting oil, is supplied under very high pressure, up to 400 to 500 pounds per square inch, and permits the use of extremely high cutting rates, up to 45 inches per minute, for example, in bronze.

As will be seen in Figures 2 and 3, the boring tool comprises a cutting element 26 mounted in the end and to one side thereof and this cutting element may be brazed in place on the drill portion 20 so as to be rigid with the entire boring bar.

On the side opposite the cutting element and so positioned as to sustain the cutting loads on the cutting element are pads 28 and 30. These pads may be of wood or plastic in certain cases but it is much preferred to form the pads of an extremely hard wear-resistant material such as tungsten carbide. The pads formed of carbide are not resilient, and vibration of the boring bar sets up extremely quickly in case the feed is interrupted or whenever the drill commences to break through the end of the workpiece as in Figure 2.

The forming of the pads of a resilient material has some effect toward eliminating the vibration, but any resilient material wears down rapidly and is therefore unsatisfactory.

According to the present invention, carbide pads are employed and the drill end of the boring tool is provided with a relieved portion 32 between the pads. This relieved portion has the effect of causing a pressure drop in the region between the pads and since there is no relief about the boring bar on the opposite side, the boring bar will be thrust toward the pads by the pressure of the lubricant surrounding the boring bar so that even when the feed is interrupted or the boring bar breaks through the end of the workpiece, there will be no tendency for the boring bar to vibrate or chatter so long as the coolant supply is maintained.

The opposite ends of the workpiece are sealed by the seals 34 and 36 and, accordingly, the coolant supply can be maintained to the workpiece and under pressure even though the cutting operation is interrupted or the boring bar breaks through the end of the workpiece.

The flow of lubricant along the boring bar is maintained since the boring bar is hollow and the drill portion 20 thereof has a passage 38 that extends from adjacently cutting element 26 to the passage extending along the boring bar. The arrangement thus establishes a dynamic action as long as the lubricant is flowing that will hold the boring bar against the side of the hole opposite cutting element 26. The amount of the lateral pressure on the boring bar can be regulated by the size of the relieved portion 32 so that, depending on the circumstances, there can be a relatively small or relatively large lateral pressure established for stabilizing the boring bar.

I have found that a pronounced stabilizing effect is obtained by practicing the present invention and that the variation in diameter of a bored hole can be substantially reduced.

For example, a 1 1/16 inch diameter hole was bored through a 13 inch long piece of bronze and it was found that the hole at the breakthrough end was perfectly smooth and free of all chatter marks and that the diameter difference throughout the length of the bored hole, including the breakthrough end, was within .0002 inch.

In order to provide ample support for the cutting element it is usual for the tubular portion of the boring tool to have relatively small clearance inside the hole being bored. This also provides for the maximum space inside the boring tool for the return travel of the lubricant and chips. For this reason, the recess between the support pads provides for a substantial pressure drop by means of which the lateral thrust on the boring tool toward the pads is maintained by the supply of coolant thereto upon interruption of the feed or at the point of breakthrough of the cutting tool.

It will be evident that the present invention provides means for greatly improving the efficiency of the boring machine of the general nature referred to, not only in the boring of holes originally in workpieces but also in the case of counter boring holes wherein only a small amount of stock might be removed thereby introducing the possibility that the lateral pressure of the boring bar due to the cutting action might be insufficient to prevent chattering.

By utilizing the present invention, such counter boring wherein only a small amount of stock is removed, or in any other case where light cuts are being taken, may be carried out and the resultant hole will be substantially true throughout the length of the cut taken.

It will be understood that this invention is susceptible to modification in order to adapt it to different usages and conditions; and, accordingly, it is desired to comprehend such modifications within this invention as may fall within the scope of the appended claims.

I claim:

1. In a boring tool for the rapid boring of deep holes in rotating workpieces; a tubuar member only slightly smaller than the hole to be bored, a cutting element projecting from the one end and to one side of the tubular member at the workpiece end thereof, a pair of rigid support pads extending from the other side of the tubular member at said one end spaced from each other and from the cutting element whereby to support the lateral thrusts imposed on the boring tool by the cutting action, means for supplying a fluid under high pressure along the outside of the tubular member, said fluid returning through the member together with the chips taken by the boring tool, and means for maintaining a continuous thrust on the tubular member laterally thereof toward the said pads thereby to inhibit vibration of the boring tool in the absence of cutting thrust thereon, said means comprising a recess extending from the said one end of the tubular member backwardly therealong, said recess being located between said pads and providing a region wherein the pressure on the said fluid is reduced, said recess terminating a short distance beyond said pads.

2. In a boring tool for the rapid boring of deep holes in rotating workpieces; a tubular member only slightly smaller than the hole to be bored, a cutting element projecting from the one end and to one side of the tubular member at the workpiece end thereof, a pair of rigid support pads extending from the other side of the tubular member at said one end spaced from each other and from the cutting element whereby to support the lateral thrusts imposed on the boring tool by the cutting action, means for supplying a fluid under high pressure along the outside of the tubular member, said fluid returning through the member together with the chips taken by the boring tool, and means for maintaining a continuous thrust on the tubular member laterally thereof toward the said pads thereby to inhibit vibration of the boring tool in the absence of cutting thrust thereon, said means comprising a recess which extends from the cutting end of said tool backwardly therealong and terminating a short distance from said workpiece end to provide a region wherein the pressure on the said fluid is reduced.

References Cited in the file of this patent

UNITED STATES PATENTS

| | | |
|---|---|---|
| 1,304,981 | Hoagland | Jan. 19, 1918 |
| 2,182,263 | Probert | July 6, 1936 |
| 2,418,021 | Fleischer | Mar. 25, 1947 |

FOREIGN PATENTS

| | | |
|---|---|---|
| 1,096,352 | France | Jan. 26, 1955 |
| 755,653 | Great Britain | Aug. 22, 1956 |